March 6, 1973  J. E. BRIDEGUM  3,719,345
DRAIN FITTING
Filed May 10, 1971

INVENTOR:
JAMES EARL BRIDEGUM
BY
Pastoriza & Kelly
ATTORNEYS 3,719,345
DRAIN FITTING
James Earl Bridegum, 12143 Gothic Ave.,
Granada Hills, Calif. 91344
Filed May 10, 1971, Ser. No. 141,778
Int. Cl. F16k *31/50*
U.S. Cl. 251—351                              3 Claims

ABSTRACT OF THE DISCLOSURE

A drain stem formed in its side wall with a port is coupled to a mounting sleeve structured for being mounted to a liquid container. A collar coupled to the drain stem can be moved to uncover the port and allow liquid to be drained from the container.

BACKGROUND OF THE INVENTION

This invention relates to drain fittings and more specifically to a simple, inexpensive, easily operated, virtually trouble-free drain fitting for a water tank.

It is common practice to install drain valves into certain types of liquid containers such as water heater tanks so that the liquid can be drained away by hose periodically for flushing purposes or to facilitate repair of the water tank. It is often impossible and always cumbersome to gain access to internal components requiring attention unless the liquid is removed. Drain valves are deemed mandatory by various approving agencies and accordingly are installed as original equipment.

The trouble with conventional drain fittings is that they generally have too many parts which not only are relatively expensive but increase the likelihood of mismatched components and corresponding premature erosion and wear. Numerous parts tend to increase the risk of leakage and need for frequent replacement.

In addition the valves ordinarily include flexible sealing rings such as O-rings constructed from rubber or plastic that become repetitively exposed to lime and other granular sediment as the water is discharged. When sediment becomes trapped between the flexible seal and valve it tends to cut into and erode the seal to a degree where leakage passages are formed.

Moreover, the flexible sealing gaskets or O-rings incorporated in conventional drain fittings used with hot water tanks eventually become at least partially directly exposed to hot water which serves to further deteriorate the seal.

Some conventional drain fittings are constructed so that they may not be disassembled without destroying them and so, after a single use, they must be totally replaced.

SUMMARY OF THE INVENTION

Briefly stated this invention is a drain fitting having a hollow drain stem formed with a closed end, an open end, a side wall with a threaded exterior and a port located between the ends of the stem and which extend through the side wall. Coupled to and aligned coaxially with the drain stem is mounting sleeve that is structured to be installed in a liquid tank and thereby mount the drain fitting to the tank. A collar is coupled to the drain stem and has a coupling structured for attachment to a conventional drain hose. Axial movement of the collar in one direction causes the port to become uncovered so liquid can be drained from the tank.

In one embodiment the mounting sleeve normally covers the port and has a threaded interior interengaged with the drain stem threaded exterior. The collar is rigidly coupled to the drain stem open end so that relative movement between the drain stem and mounting sleeve can be caused by rotating the collar. The drain stem threaded exterior and mounting sleeve threaded interior are formed with left handed threads.

In a second embodiment the collar normally covers the port and has a threaded interior interengaged with the drain stem threaded exterior. The mounting sleeve is rigidly coupled to the drain stem open end so that relative movement between the collar and drain stem can becaused by rotating the collar.

BRIEF DESCRIPTION OF THE DRAWINGS

The numerous benefits and unique aspects of the present invention will be fully understood when the following detailed description is studied in conjunction with the drawings in which.

DETAILED DESCRIPTION AND OPERATION OF THE PREFERRED EMBODIMENTS

Figure 1:
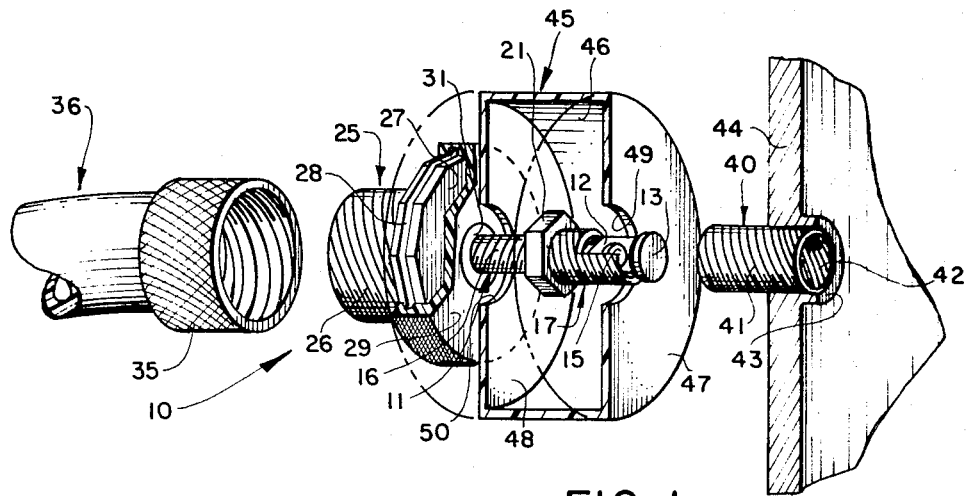
FIG. 1 is a perspective, partially broken away, exploded view showing a drain fitting constructed in accordance with this invention.
Figure 2:
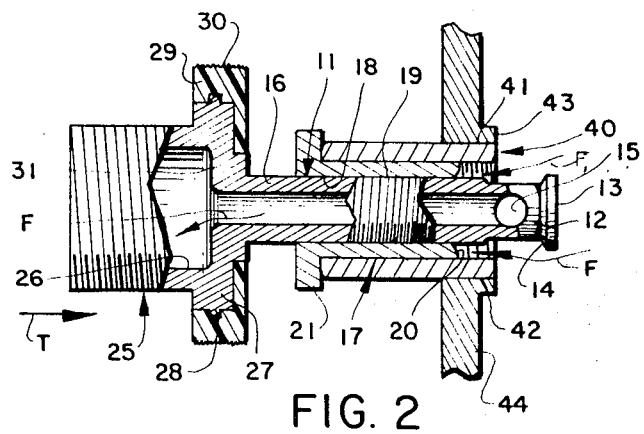
FIG. 2 is a longitudinal, sectional view of the drain fitting shown in FIG. 1 wherein the valve is open for draining purposes; and, FIG. 3 is a longitudinal, sectional view showing another embodiment of a drain fitting constructed in accordance with this invention.

Referring now to FIG. 1 and FIG. 2 a first embodiment of a drain fitting 10 is shown that includes a hollow drain stem 11 having an inner portion 12 terminating in an enlarged closed end 13 defining a beveled valve seat 14. The drain stem inner portion 12 is formed with one or more radially extending ports 15 and has an outer portion 16. The majority of drain stem inner portion 12 and outer portion 16 is formed with left handed threads.

A mounting sleeve 17 is coupled to and coaxially aligned with drain stem 11. It has internal left handed threads 18 interengaged with mating left handed threads of drain stem 11 and external threads 19. The front or inner portion of mounting sleeve 17 is formed with an annular beveled valve 20 shaped to engage valve seat 14 and its rear or outer portion is formed with an enlarged mounting nut 21 that may be initially used to install the overall drain fitting 10.

Secured to stem 11 is a collar 25 formed at its outer portion with a coupling 26 having external threads and at its inner portion with a radially extending flange 27 that is preferably hexagonal or octagonal in cross section. The edge or periphery of flange 27 is shaped with a retention ridge 28 that may be continuous or interrupted. A flexible gripping ring 29 constructed preferably of a durable insulating material such as a suitable plastic is positioned snugly over flange 27 and has a cross section which generally matches that of flange 27. One or more grooves formed within ring 29 register and interfit with the ridge 28 or ridge segments of flange 27. To mount gripping ring 29 in place it may be stretched and press fitted onto flange 27.

Coaction between retention ridge 28 and its mating groove prevents ring 29 from slipping axially out of position and the irregular cross section prevents relative rotation between ring 29 and flange 27. The external periphery of ring 29 has knurls or serrations 30 in order to provide a gripping surface for a person desiring to manually turn collar 25.

The innermost portion 31 of collar 25 is welded or otherwise rigidly secured to the outer portion 16 of drain stem 11. The external threads of coupling 26 are sized to interengage with a rotatable attachment 35 of a conventional flexible hose 36. A mounting tube 40 with external threads 41 and internal threads 42 is mounted at an appropriate location within a drain exit 43 of a hot water heater tank 44.

The portion of the overall drain fitting 10 between gripping ring 29 and water tank 44 is generally concealed by a surrounding flexible closure 45 which is structured to become deformed as collar 25 is urged inwardly. Flexible closure 45 has a tubular side wall 46, an inner wall 47 that generally bears against water tank 44 and an outer wall 48 that generally bears against collar 25. An inner circular cut-out section 49 and an outer circular cut-out section 50 are formed in closure 45 to make sufficient clearance and facilitate axial movements.

To drain water from the hot water tank 44 a person grasps the knurled surface 30 of gripping ring 29 and, due to the left handed threads, rotates collar 25 counterclockwise (as viewed from a position looking towards tank 45) so that every part of drain fitting 10 advances inwardly as indicated by directional arrow T except stationary mounting sleeve 17. When the valve seat 14 has been displaced by a sufficient distance from annular valve 20 to expose the one or more ports 15, the water or other liquid in tank 44 flows through port 15, outwardly through stem 11, into collar 25 eventually to some predetermined remote location through hose 36. The left handed thread interengagement prevents the sleeve 17 from becoming loosened or unthreaded as the port 15 is being uncovered. The drain stem 11, mounting sleeve 17 and collar 25 can be generally constructed from a suitable metal such as brass or a suitable durable plastic such as polyvinylchloride or from different materials compatible with one another. Whereas it is customary in the trade to fabricate the tubular components of drain fittings with relatively large diameters that necessarily requires usage of excessive material, the mounting sleeve 17 of drain fitting 10 is relatively small so that considerable material for it and the other components can be saved or not needlessly employed.

Figure 3:
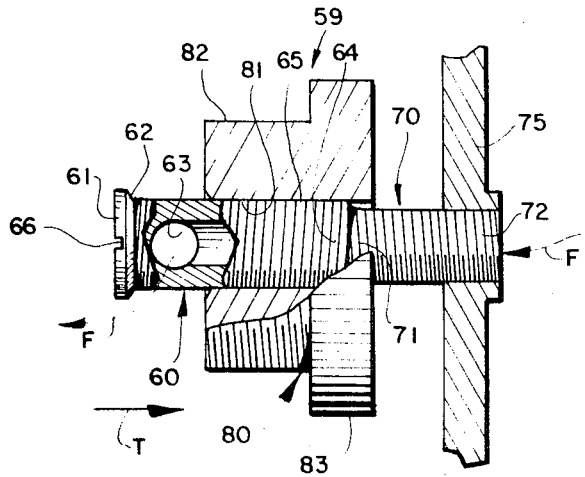

Referring now to FIG. 3 a second embodiment of this invention is shown in the form of a drain fitting 59 with a drain stem 60 having a closed outer end 61 formed with a stop or valve seat 62 and an exit port 63. Drain stem 60 has an open inner end 64 and its side wall exterior is generally formed with left handed threads 65. A tightening slot 66 is formed within closed end 61. Rather than being threadably engaged with drain stem 60, as in the case of the embodiment described in conjunction with FIG. 1, mounting sleeve 70 is rigidly fixed by way of its outer end 71 to the drain stem inner end 64. The inner end 72 of mounting sleeve 70 is threadably engaged within a suitable exit of a water tank 75.

Mounted for axial movement along drain stem 60 is a collar 80 having internal left handed threads 81 which interengage with the external left handed threads 65 of drain stem 60. The outer periphery of collar 80 is formed with external threads 82 sized for making interengagement with the coupling of a conventional hose (not shown). A gripping ring 83 may be either manually grasped or mechanically engaged in order to axially move collar 80 in the desired direction.

Once the drain fitting 59 is installed in tank 75 only collar 80 moves during operation. Drain fitting 59 may be installed within tank 75 in various ways such as by applying torque to mounting sleeve 70 by way of a screwdriver inserted in the tightening slot 66 of drain stem 60. When a hose is attached to collar 80 then a part of drain stem 60 would project into the hose.

To expose port 63 for drainage purposes collar 80 is merely screwed towards tank 75 as indicated by directional arrow T and eventually the water will flow outwardly, as indicated by directional arrow F, of port 63 and into the hose to some remote location.

Whereas the drain stem of the FIG. 1 embodiment is movable and aimed towards the water tank the drain stem of FIG. 3 embodiment is stationary and aimed in the opposite direction towards the hose.

From the foregoing it will be appreciated that this invention has provided a drain fitting in which all of the various advantages are fully realized.

What is claimed is:

1. A drain fitting for a water tank comprising:
   (a) a hollow drain stem having a closed end, an open end, a side wall with a threaded exterior and a port located between the ends and extending through the side wall;
   (b) a mounting sleeve coupled to and aligned coaxially with the drain stem and having a threaded interior interengaged with the drain stem threaded exterior, the sleeve being structured to mount the drain fitting in a water tank and normally cover the port;
   (c) a collar rigidly coupled to the drain stem open end and structured for attachment to a drain hose so that relative movement between the drain stem and mounting sleeve can be caused by rotating the collar in order to cause uncovering of the port for drainage of water therethrough;
   (d) a valve seat formed by the drain stem closed end and an annular valve formed by the mounting sleeve that mates with the valve seat when the port is closed;
   (e) a nut on the mounting sleeve for use in installing the mounting sleeve to a water tank;
   (f) a mounting tube capable of being secured in the side wall of a water tank and having a threaded interior for mating with the mounting sleeve threaded exterior; and,
   (g) a flexible closure positioned over and generally concealing the mounting sleeve and drain stem.

2. The structure according to claim 1, wherein:
   the collar has a flange and a gripping ring coupled to the outer periphery of the flange for use in manually rotating the collar.

3. The structure according to claim 2, wherein:
   the flange and ring have first mating elements for preventing relative rotation and second mating elements for preventing relative axial slipping.

References Cited

UNITED STATES PATENTS

| | | | |
|---|---|---|---|
| 1,442,226 | 1/1923 | Kraft | 251—351 |
| 2,859,932 | 11/1958 | Mackal | 251—349 |
| 2,985,180 | 5/1961 | Grayson | 251—351 X |
| 3,184,091 | 5/1965 | Hoffman | 251—351 X |
| 3,196,688 | 7/1965 | Smith | 251—351 X |
| 2,880,748 | 4/1959 | Elsey | 137—454.6 X |
| 2,082,807 | 6/1937 | Miller | 137—454.5 X |
| 2,925,989 | 2/1960 | Hempel | 251—351 X |
| 3,181,555 | 5/1965 | Jackson | 251—351 X |
| 3,252,661 | 5/1966 | Aldrich | 251—349 X |
| 3,521,666 | 7/1970 | Scaramucci | 137—454.2 |

SAMUEL SCOTT, Primary Examiner